(12) United States Patent
Ishii

(10) Patent No.: US 10,306,141 B2
(45) Date of Patent: May 28, 2019

(54) IMAGE PROCESSING APPARATUS AND METHOD THEREFOR

(71) Applicant: CANON KABUSHIKI KAISHA, Tokyo (JP)

(72) Inventor: Toshiyuki Ishii, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 317 days.

(21) Appl. No.: 15/413,999

(22) Filed: Jan. 24, 2017

(65) Prior Publication Data

US 2017/0230577 A1    Aug. 10, 2017

(30) Foreign Application Priority Data

Feb. 9, 2016  (JP) ................. 2016-023075

(51) Int. Cl.
| | |
|---|---|
| H04N 7/18 | (2006.01) |
| H04N 5/232 | (2006.01) |
| G06T 7/11 | (2017.01) |
| G06T 7/30 | (2017.01) |
| G06T 5/00 | (2006.01) |
| G06T 7/00 | (2017.01) |
| H04N 5/235 | (2006.01) |
| H04N 5/265 | (2006.01) |

(Continued)

(52) U.S. Cl.
CPC ......... *H04N 5/23238* (2013.01); *G06T 5/006* (2013.01); *G06T 5/007* (2013.01); *G06T 5/009* (2013.01); *G06T 5/50* (2013.01); *G06T 7/0002* (2013.01); *G06T 7/11* (2017.01); *G06T 7/30* (2017.01); *H04N 5/2352* (2013.01); *H04N 5/265* (2013.01); *G06T 2207/10016* (2013.01); *G06T 2207/10144* (2013.01); *G06T 2207/20208* (2013.01); *H04N 5/2259* (2013.01)

(58) Field of Classification Search
CPC .................................................. H04N 5/23238
USPC .......................................................... 348/38
See application file for complete search history.

(56) References Cited

U.S. PATENT DOCUMENTS

| | | | | |
|---|---|---|---|---|
| 6,608,926 B1 * | 8/2003 | Suwa | ...................... | G06T 5/009 358/520 |
| 8,194,993 B1 * | 6/2012 | Chen | ...................... | G06T 5/006 348/231.6 |

(Continued)

FOREIGN PATENT DOCUMENTS

JP    2013-175827 A    9/2013

*Primary Examiner* — Leron Beck
(74) *Attorney, Agent, or Firm* — Venable LLP

(57) ABSTRACT

An image processing apparatus comprises an input unit configured to input a plurality of image data shot with a plurality of different exposures; a determination unit configured to determine whether each of the plurality of image data includes an exposure defect; a generation unit configured to generate a plurality of panoramic images respectively corresponding to the plurality of exposures by panoramically composing a plurality of image data shot with the same exposure based on a result of the determination; an alignment unit configured to perform alignment between the plurality of panoramic images using image data determined not to include the exposure defect and image data obtained by performing luminance correction for image data determined to include the exposure defect; and a composition unit configured to perform high dynamic range composition for the plurality of aligned panoramic images.

13 Claims, 11 Drawing Sheets

(51) Int. Cl.
*G06T 5/50* (2006.01)
*H04N 5/225* (2006.01)

(56) References Cited

U.S. PATENT DOCUMENTS

| | | | |
|---|---|---|---|
| 8,810,693 B2 | 8/2014 | Ishii | |
| 2011/0249143 A1* | 10/2011 | Tatsumi | H04N 5/2355 348/229.1 |
| 2013/0202202 A1* | 8/2013 | Hasu | G06T 3/4053 382/166 |
| 2015/0042848 A1* | 2/2015 | Furukawa | H04N 5/2355 348/242 |
| 2015/0116453 A1* | 4/2015 | Hirata | H04N 5/23245 348/38 |

* cited by examiner

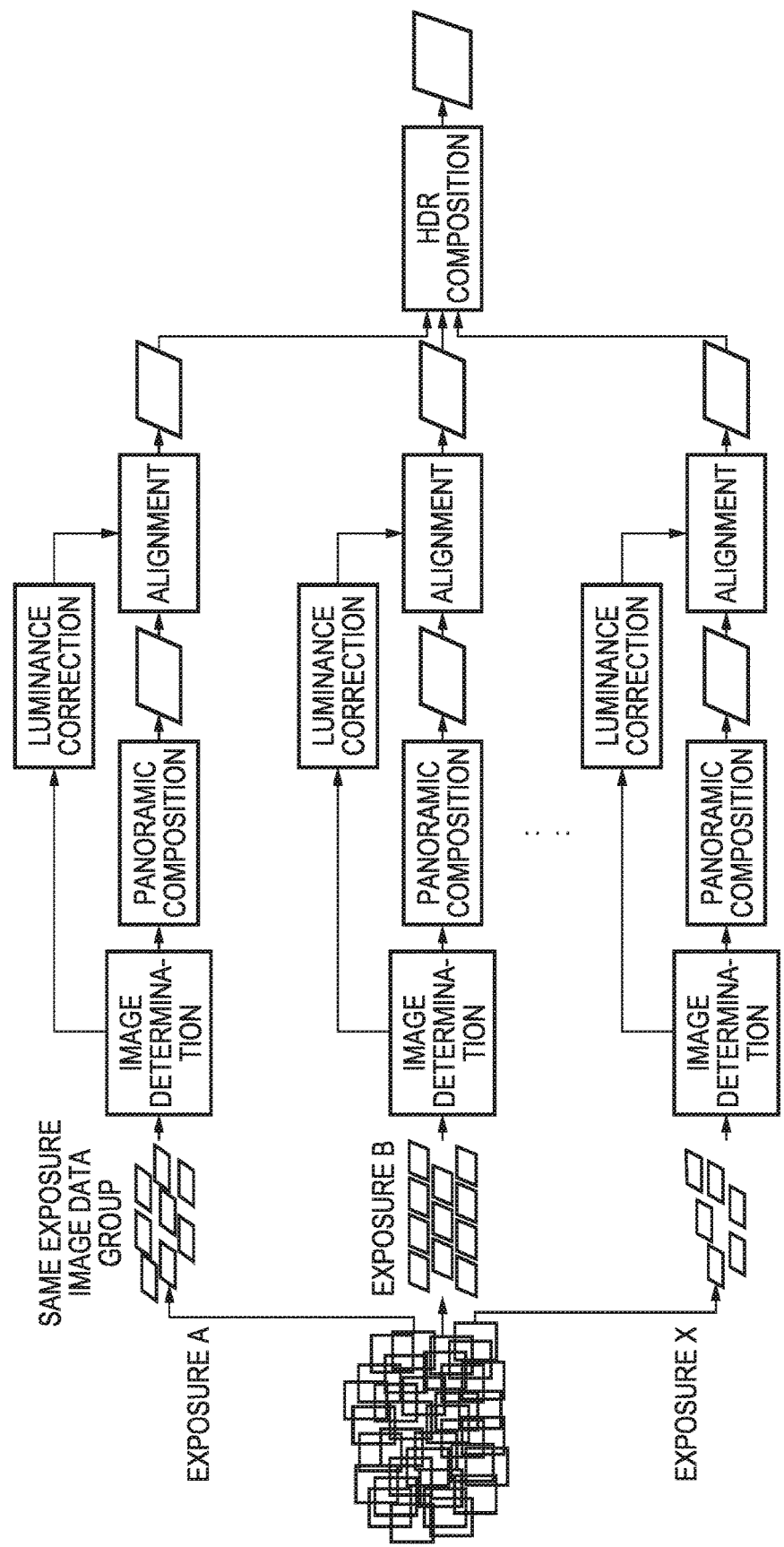

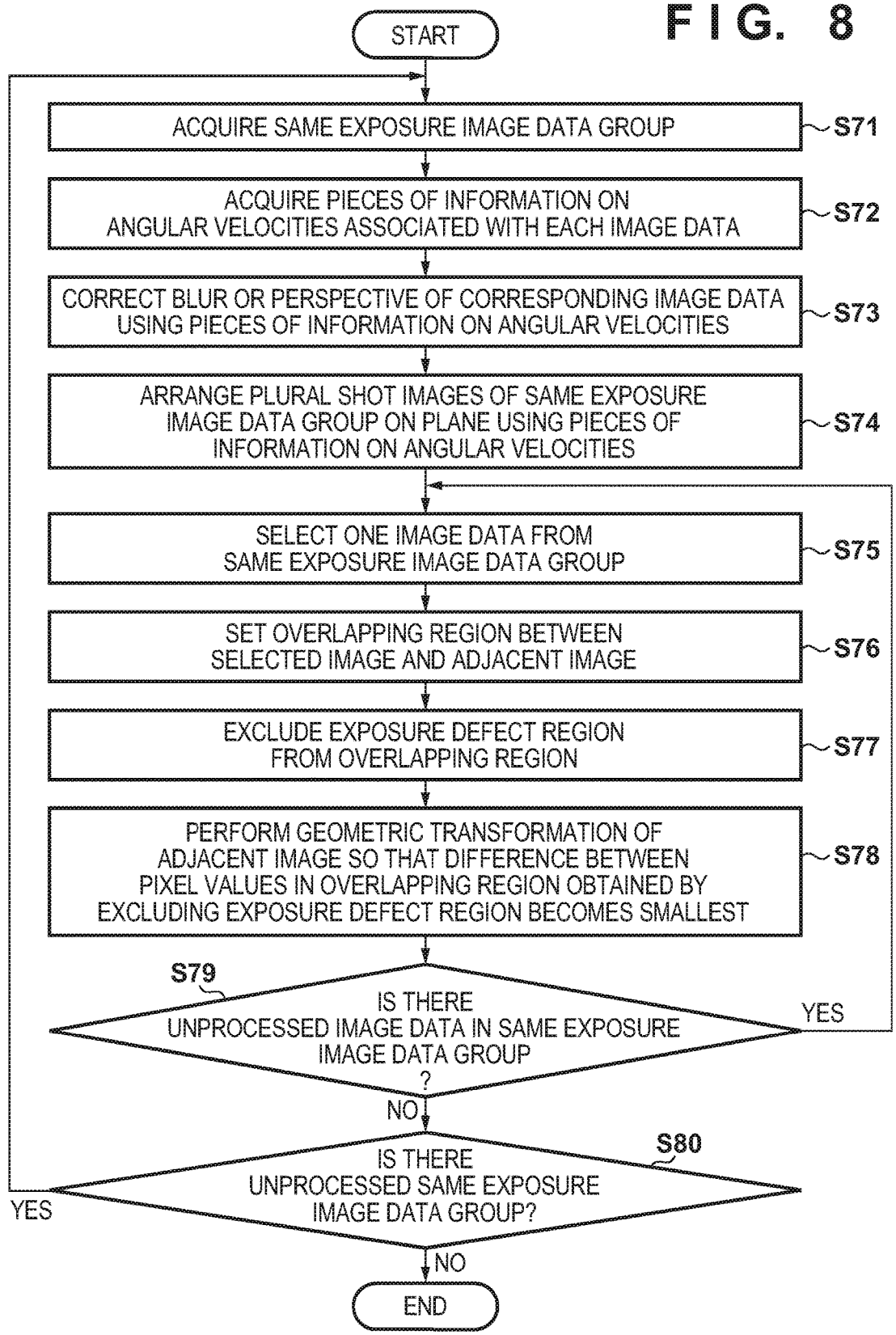

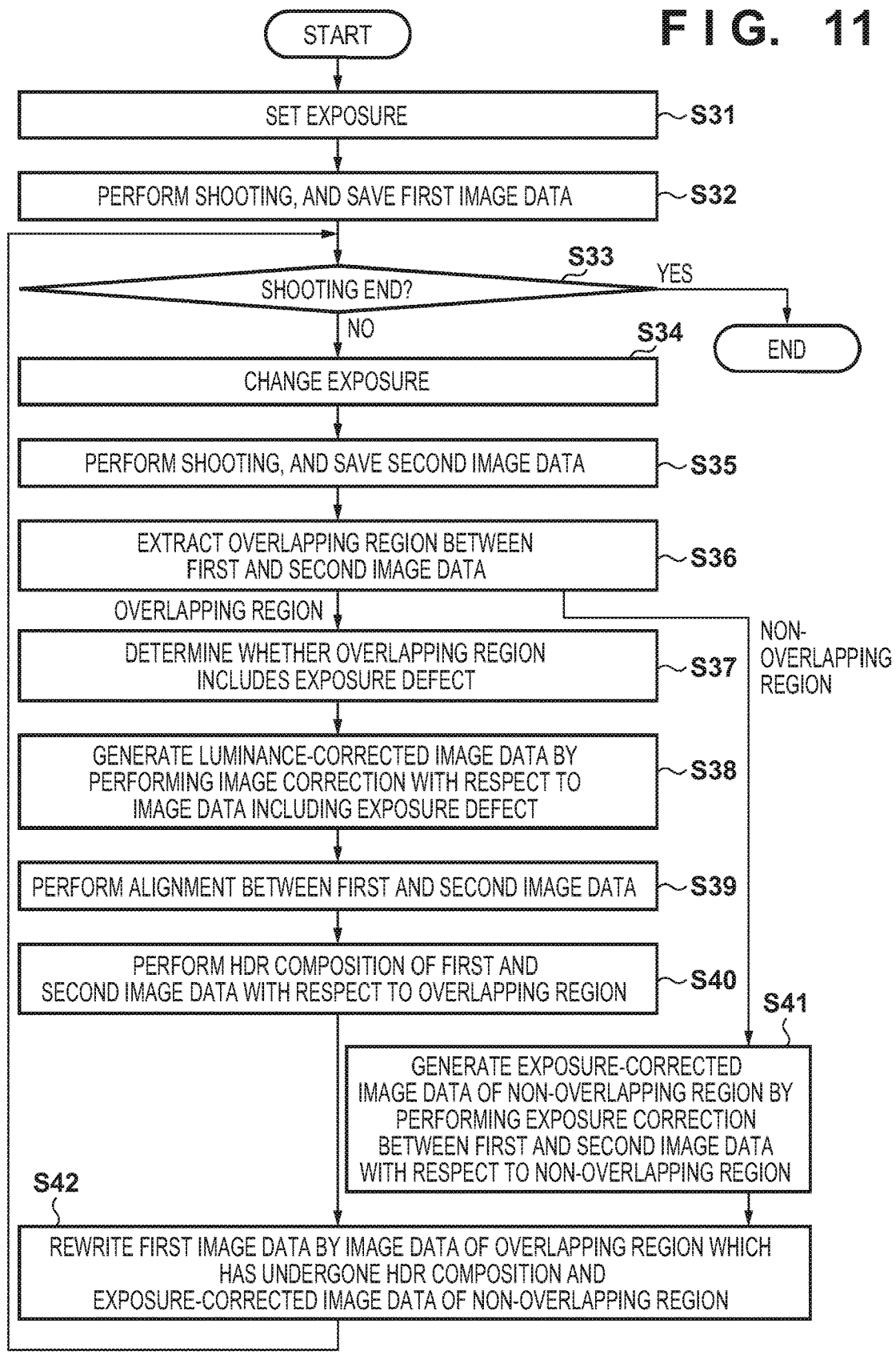

IMAGE PROCESSING APPARATUS AND METHOD THEREFOR

BACKGROUND OF THE INVENTION

Field of the Invention

The present invention relates to image processing of performing high dynamic range (HDR) composition of panoramic images.

Description of the Related Art

Panoramic shooting of shooting a plurality of images and composing the shot images into one image by joining them has widely been performed. Since a panoramic image has a very wide angle of view, sunlight or light of a street lamp is captured in outdoor shooting, and a region from a dark place at the deep end of a room to a bright place outside a window is captured in indoor shooting, resulting in an image having a very wide dynamic range in which the difference between a bright region and a dark region is large. Thus, if shooting is performed with a single exposure, "blown out highlights" may occur in a bright region and "blocked up shadows" may occur in a dark region.

The "blown out highlights" indicate that the color distribution of a shot image is localized on the white side due to overexposure, and some pixels are filled with white (pixels values are saturated). The "blocked up shadows" indicate that the color distribution of a shot image is localized on the black side due to underexposure, and some pixels are filled with black (pixel values are saturated). To acquire a panoramic image, there is proposed a method of acquiring a panoramic image without any blown out highlights or blocked up shadows by composing a plurality of low dynamic range images, which have been shot while changing the exposure, using an HDR composition method. Japanese Patent Laid-Open No. 2013-175827 proposes a method of performing HDR composition of panoramically composed images.

In the method proposed by Japanese Patent Laid-Open No. 2013-175827, however, it is necessary to perform shooting while changing the exposure for all the angles of view of a shooting target object, thereby complicating a procedure at the time of shooting. Furthermore, when composing adjacent shot images or images shot with different exposures, if the images include blown out highlights or blocked up shadows, no appropriate composition processing is performed, thereby obtaining an unnatural composition result in which misalignment occurs at the joint between the images.

SUMMARY OF THE INVENTION

According to an aspect of the present invention, a plurality of image data of different exposures are used to acquire a high dynamic range panoramic image in which misalignment of the joint between the images is suppressed and unnaturalness is eliminated.

One aspect of the present invention includes the following arrangement.

An image processing apparatus comprises: an input unit configured to input a plurality of image data shot with a plurality of different exposures; a determination unit configured to determine whether each of the plurality of image data includes an exposure defect; a generation unit configured to generate a plurality of panoramic images respectively corresponding to the plurality of exposures by panoramically composing a plurality of image data shot with the same exposure based on a result of the determination; an alignment unit configured to perform alignment between the plurality of panoramic images using image data determined not to include the exposure defect and image data obtained by performing luminance correction for image data determined to include the exposure defect; and a composition unit configured to perform high dynamic range composition for the plurality of aligned panoramic images.

According to an exemplary aspect of the present invention, a plurality of image data of different exposures can be used to acquire a high dynamic range panoramic image in which misalignment of the joint between the images is suppressed and unnaturalness is eliminated.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a view for explaining an outline of panoramic image acquisition processing according an embodiment;

FIG. 8 is a flowchart for explaining the processing of a panoramic composition unit;

FIG. 11 is a flowchart for explaining panoramic image shooting processing according to the second embodiment.

DESCRIPTION OF THE EMBODIMENTS

An image processing apparatus and an image processing method according to embodiments of the present invention will be described in detail below with reference to the accompanying drawings. Note that the embodiments are not intended to limit the present invention related to the scope of the claims, and not all of the combinations of arrangements set forth in the embodiments are necessarily required with respect to the means to solve the problems according to the present invention.

First Embodiment

[Outline of Panoramic Image Acquisition Processing]

An outline of panoramic image acquisition processing according to the embodiment will be described with reference to FIG. 1. As shown in FIG. 1, a plurality of image data (to be referred to as a same exposure image data group hereinafter) of the same exposure are acquired from a plurality of image data obtained by shooting an object by changing the exposure. Image determination is performed in terms of the presence/absence of blown out highlights or blocked up shadows (to be referred to as an exposure defect hereinafter) in each image data of the same exposure image data group, and composition (to be referred to as panoramic composition hereinafter) is performed based on a determination result to obtain a panoramic image from the same exposure image data group.

Figure 2A:
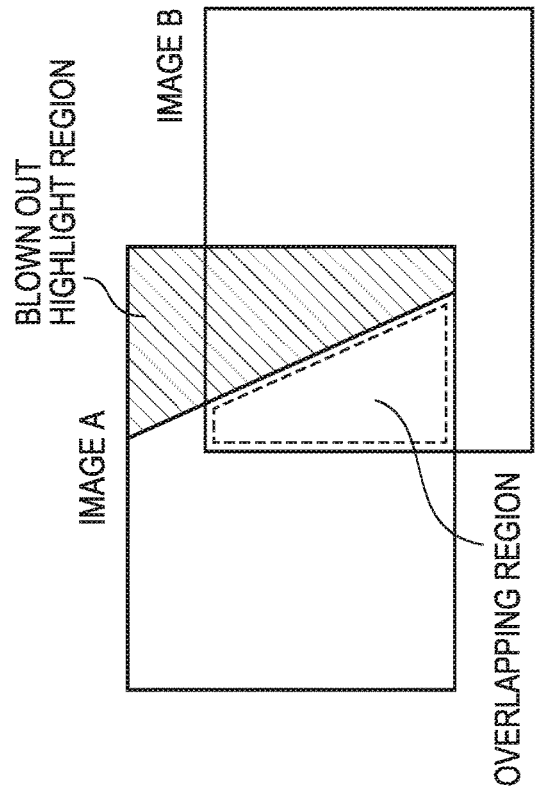
FIGS. 2A, 2B, 2C, and 2D are views for explaining panoramic composition in consideration of an exposure defect.
Figure 2B:
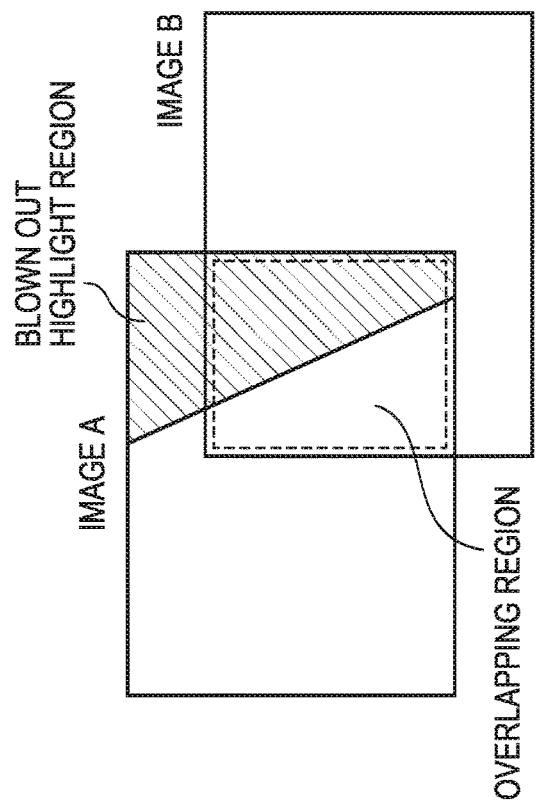
Figure 2C:
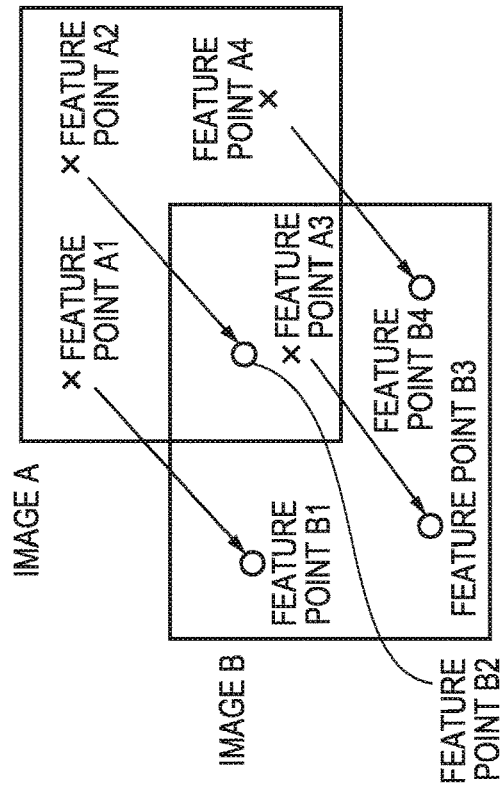

Panoramic composition in consideration of an exposure defect will be described with reference to FIGS. 2A, 2B, 2C, and 2D. As shown in FIG. 2A, in composition of adjacent images A and B, when geometric transformation of the images is performed based on an overlapping region between the images, which is indicated by broken lines, if the overlapping region includes a blown out highlight region, no appropriate panoramic composition result is obtained. To solve this problem, as shown in FIG. 2B, geometric transformation of the images is performed based on an overlapping region obtained by excluding the blown out highlight region and indicated by broken lines, and panoramic composition is performed.

Figure 2D:
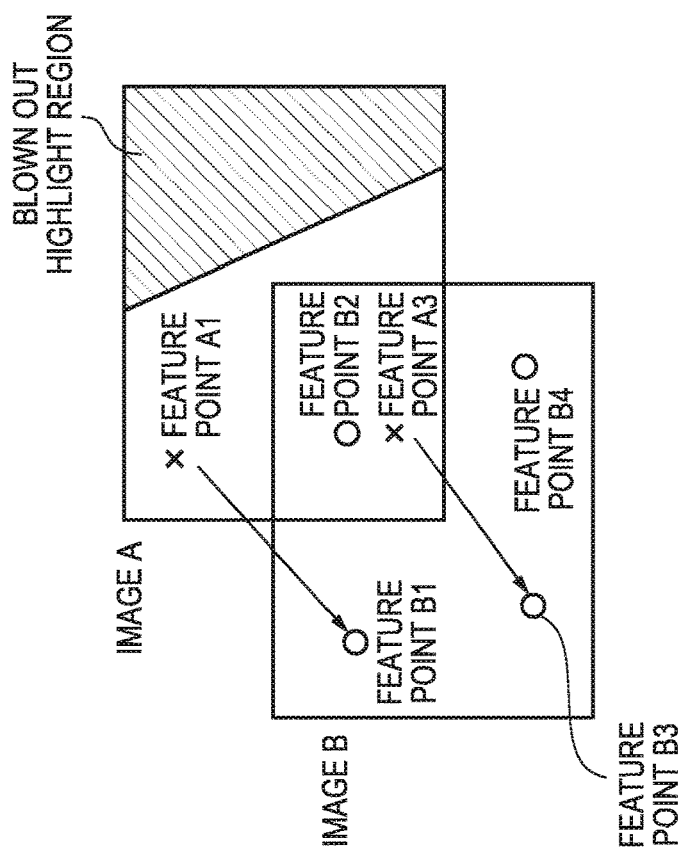

Subsequently, as shown in FIG. 1, a plurality of images having undergone panoramic composition are aligned for each same exposure image data group, and then high dynamic range composition (to be referred to as HDR composition hereinafter) is performed. When aligning images of different exposures, feature points are detected from each image to correct misalignment. However, no feature points are detected in the blown out highlight region included in the image, thereby disabling appropriate alignment. To cope with this, as shown in FIG. 2D, in order to make it possible to detect feature points included in the blown out highlight region, luminance correction is performed for the image to identify its texture, thereby improving the alignment accuracy.

In the embodiment, the exposure defect indicates not only a state in which pixel values are saturated but also a state in which the histogram of pixel values is localized on the bright portion side or dark portion side in an image shot with overexposure or underexposure with respect to a correct exposure value.

[Arrangement of Apparatus]

Figure 3:
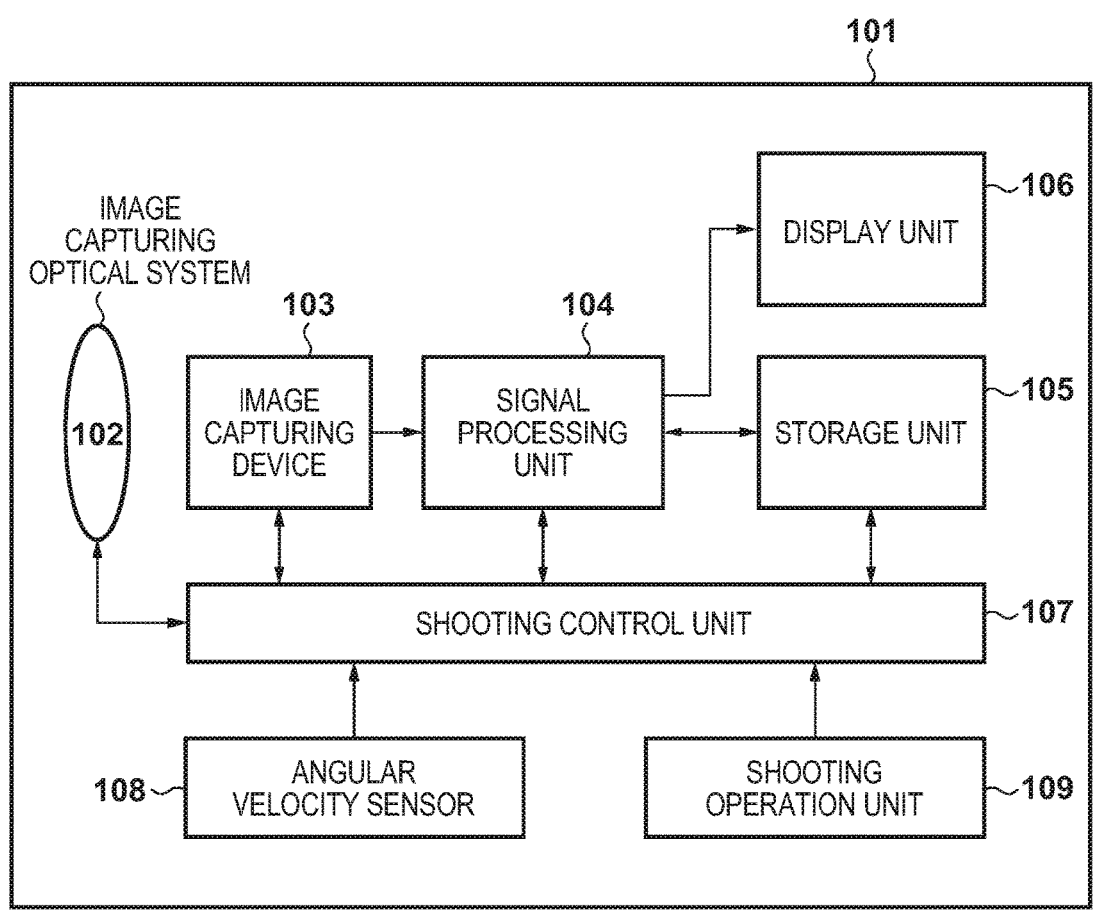
FIG. 3 is a block diagram showing an example of the arrangement of a shooting apparatus according to the embodiment.

FIG. 3 is a block diagram showing an example of the arrangement of a shooting apparatus 101 according to the embodiment. An image capturing optical system 102 causes an image capturing device 103 such as a CCD or CMOS sensor to form an image of light from a shooting target scene. The image capturing device 103 outputs an electrical signal obtained by photoelectrically converting the formed optical image. A signal processing unit 104 performs predetermined processing for the electrical signal output from the image capturing device 103 to generate image data of the scene, and stores the image data in a storage unit 105 or displays an image represented by the image data on a display unit 106 such as an LCD. Note that the image displayed on the display unit 106 may be an image represented by image data stored in the storage unit 105.

A shooting control unit 107 controls the overall operation of the shooting apparatus 101 by controlling the zoom, focus, aperture value, shutter, and the like of the image capturing optical system 102, the image capturing device 103, the signal processing unit 104, and the storage unit 105. An angular velocity sensor 108 acquires information on the angular velocity of the shooting apparatus 101 at the time of shooting, and output the information on the angular velocity to the shooting control unit 107. The shooting control unit 107 adds the information on the angular velocity at the time of shooting of image data to the header information of the image data or the like.

A shooting operation unit 109 receives a user instruction, and outputs the user instruction to the shooting control unit 107. The display unit 106 includes a touch panel, and the touch panel and a graphical user interface (GUI) displayed on the display unit 106 function as part of the shooting operation unit 109. The shooting control unit 107 is formed by a one-chip microprocessor or the like, and executes a program stored in an internal ROM or the storage unit 105 using an internal RAM or the storage unit 105 as a work memory. This implements control of each unit of the shooting apparatus 101 and various image processes including panoramic image shooting processing (to be described later).

Figure 4:
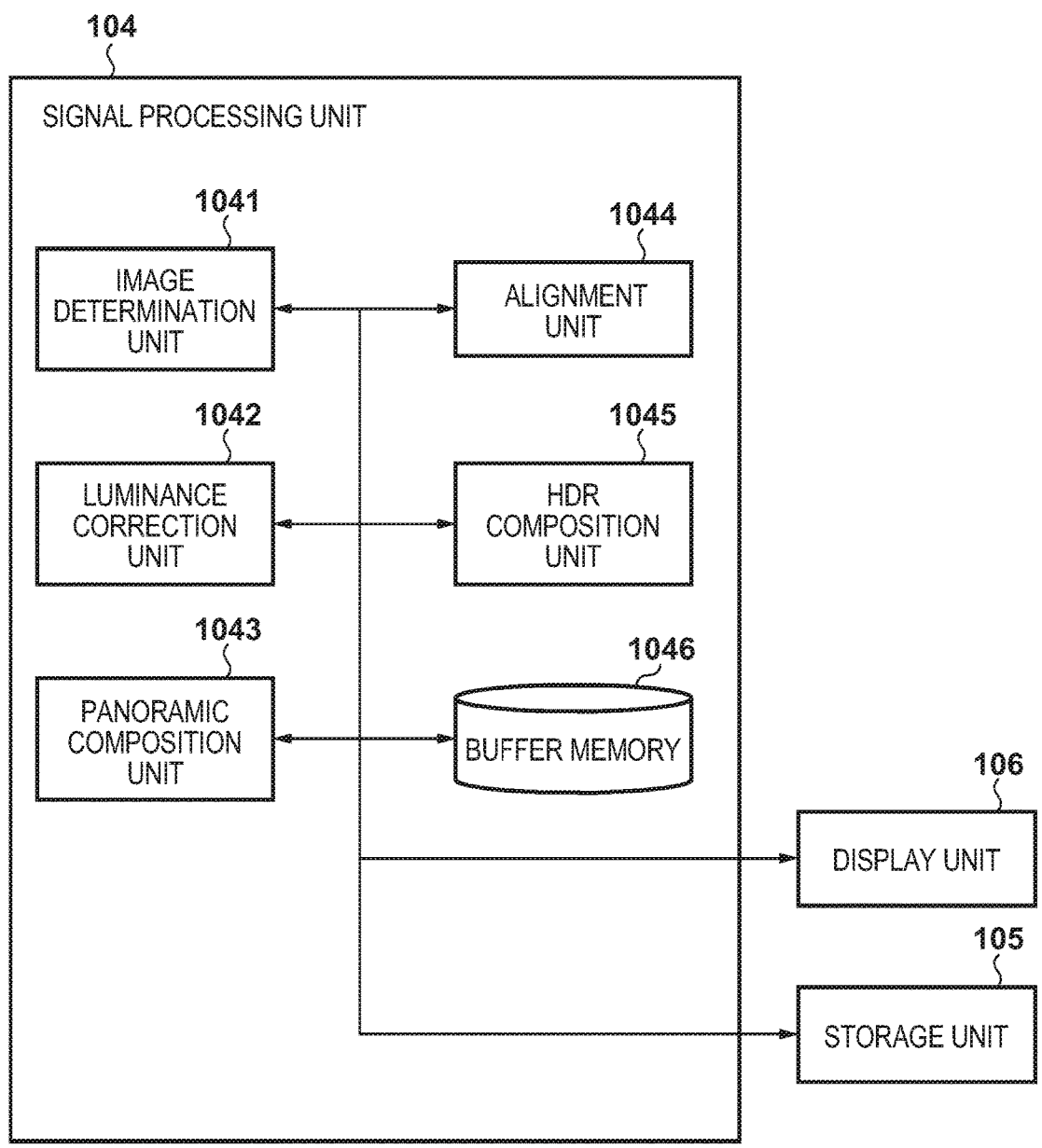
FIG. 4 is a block diagram showing an example of the arrangement of processing units associated with panoramic composition in a signal processing unit.

FIG. 4 is a block diagram showing an example of the arrangement of processing units associated with panoramic composition in the signal processing unit 104. An image determination unit 1041 acquires shot image data from the storage unit 105 under the control of the shooting control unit 107, and determines whether an image (to be referred to as a shot image hereinafter) represented by the shot image data includes an exposure defect. A luminance correction unit 1042 performs luminance correction of the shot image.

A panoramic composition unit 1043 performs panoramic composition to join a plurality of shot images. An alignment unit 1044 aligns images shot with different exposures. An HDR composition unit 1045 performs HDR composition. A buffer memory 1046 is used for various processes in the signal processing unit 104.

[Panoramic Image Shooting Processing]

Figure 5:
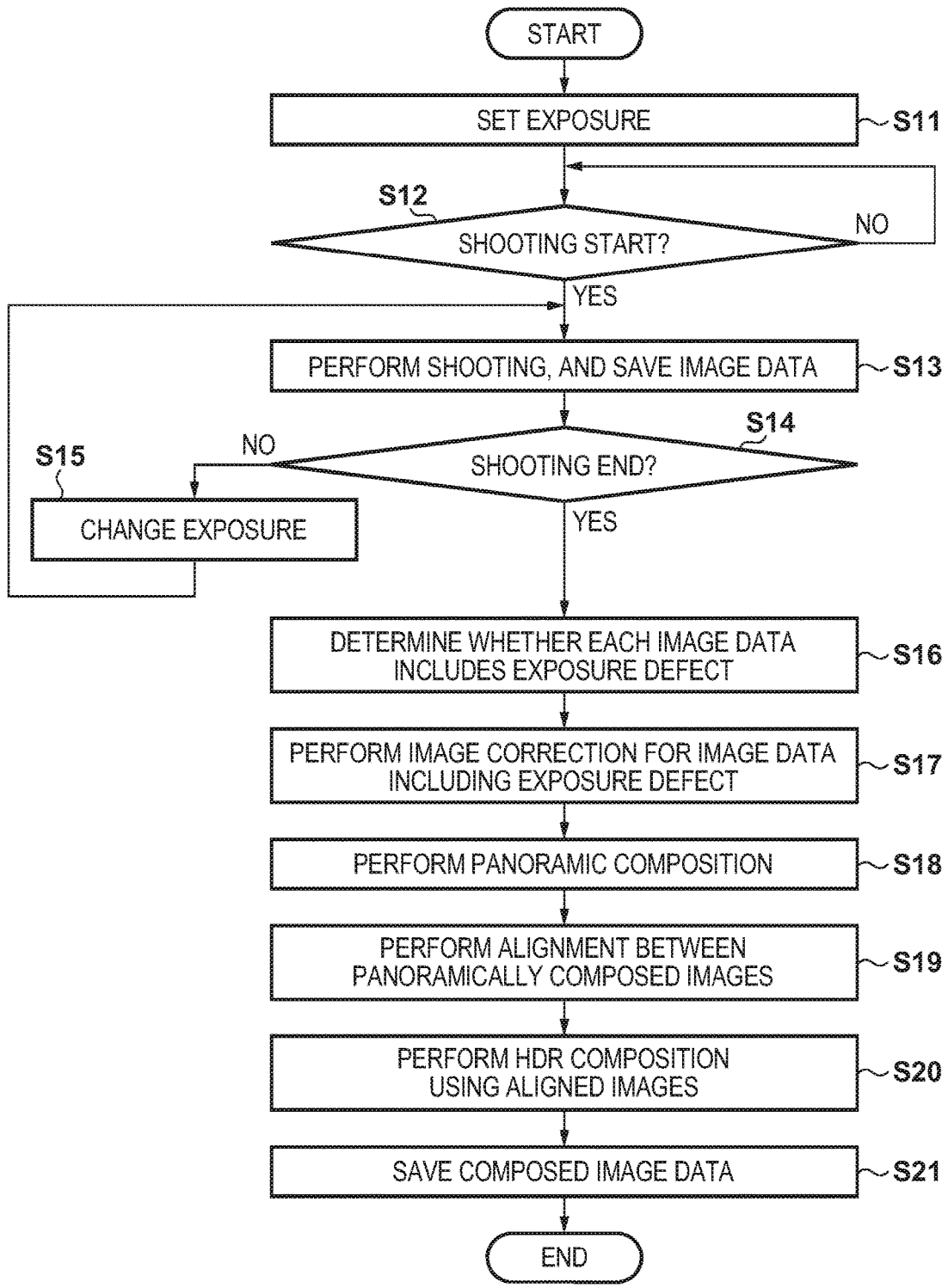
FIG. 5 is a flowchart for explaining panoramic image shooting processing.

Panoramic image shooting processing will be described with reference to a flowchart shown in FIG. 5. When panoramic shooting is instructed via the shooting operation unit 109 or the GUI, the shooting control unit 107 sets an exposure at the time of shooting (step S11). When the user presses the release button of the shooting operation unit 109, the shooting control unit 107 determines a shooting start (step S12). Then, the shooting control unit 107 controls the image capturing optical system 102 and the image capturing device 103 to perform shooting, and controls the signal processing unit 104 to save shot image data in the storage unit 105 (step S13).

When the user touches a "shooting end button" displayed on the GUI, shooting ends. Therefore, until the shooting end button is pressed, the process advances to step S15 by determination processing in step S14 to continue an exposure changing operation (step S15) and a shooting operation with a changed exposure (step S13) by the shooting control unit 107. In other words, the user instructs a shooting start, and moves the angle of view of the shooting apparatus 101 from, for example, the left end of a panoramic shooting range to its right end. When the user determines that the angle of view has reached the right end, he/she instructs a shooting end. During this period, the shooting control unit 107 performs continuous shooting by sequentially changing the exposure, for example, by sequentially switching among three different exposures.

The exposure is changed by, for example changing the shutter speed. However, the exposure may be changed by changing the ISO sensitivity, the aperture value, or the like, or a combination thereof. Furthermore, for example, the exposure is changed by ½ or ⅓ EV but the exposure change amount is arbitrary. Note that a shooting end instruction is not limited to the "shooting end button" of the GUI. When the release button is pressed again, shooting may end. Alternatively, the shooting control unit 107 may start or end shooting based on the recognition result of a voice (for example, "shooting start" or "shooting end") by a voice recognition unit which is not shown in FIG. 3.

If a shooting end is instructed, the process advances to step S16, and the image determination unit 1041 determines whether each shot image data includes an exposure defect (step S16). Blown out highlight determination is performed using a blown out highlight determination threshold (to be referred to as a white threshold hereinafter) based on the ratio of the number of pixels having pixel values equal to or larger than the white threshold to the total number of pixels of the image data. Similarly, blocked up shadow determination is performed using a blocked up shadow determination threshold (to be referred to as a black threshold hereinafter) based on the ratio of the number of pixels having pixel values equal to or smaller than the black threshold to the total number of pixels of the image data.

For example, for the white threshold=240, image data in which the ratio of the number of pixels with the G component values (to be referred to as G values hereinafter)≥240 is 1% or higher is determined to include blown out highlights. For the black threshold=16, image data in which the ratio of the number of pixels with the G values≤16 is 1% or higher is determined to include blocked up shadows. Note that the above thresholds and ratio are merely examples, and other thresholds and ratios can be arbitrarily set.

The luminance correction unit 1042 performs image correction to allow detection of the texture of an image with respect to the image data which has been determined to include an exposure defect (step S17). Subsequently, the panoramic composition unit 1043 performs panoramic composition (step S18), and the alignment unit 1044 aligns the panoramically composed images (step S19). The luminance correction, panoramic composition, and alignment will be described in detail later.

The HDR composition unit 1045 performs HDR composition using the aligned images (step S20). For HDR composition, for example, the technique disclosed in Japanese Patent Laid-Open No. 2013-175827 or the like is used. The signal processing unit 104 saves the composed image data in the storage unit 105 (step S21), and ends the panoramic image shooting processing.

Luminance Correction Unit

Figure 6:
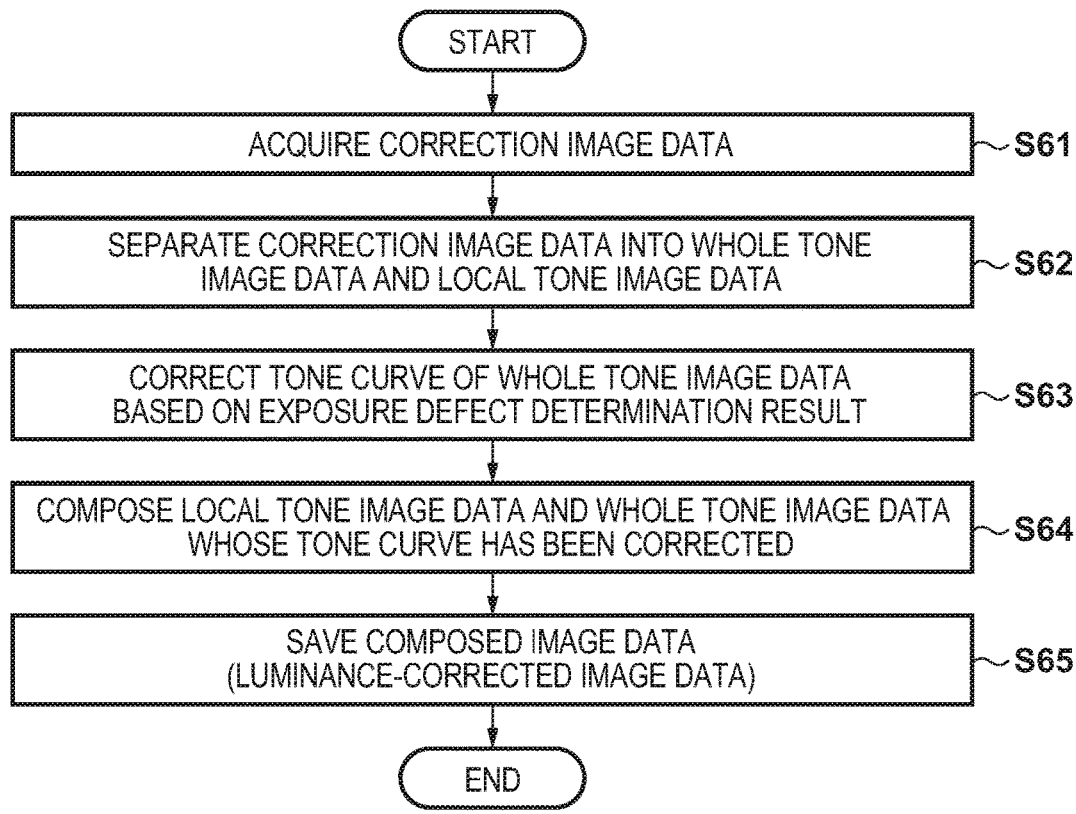
FIG. 6 is a flowchart for explaining the processing of a luminance correction unit.

The processing (step S17) of the luminance correction unit 1042 will be described with reference to a flowchart shown in FIG. 6. The luminance correction unit 1042 acquires the image data (to be referred to as the correction image data hereinafter) determined to include an exposure defect (step S61), and separates the correction image data into whole tone image data and local tone image data by filter processing (step S62). For example, the correction image data is smoothed by a Gaussian filter given by:

$$G(x, y) = \left(\frac{1}{2\pi\sigma^2}\right) \exp\left\{-\frac{x^2 + y^2}{2\sigma^2}\right\} \quad (1)$$

This separates the whole tone image data. In addition, the value of each pixel of the correction image data is divided by the value of a corresponding pixel of the whole tone image data, thereby separating the local tone image data.

Although a size of 1/10 of the input image is used as a kernel size σ of the Gaussian filter, the size is not limited to this. Instead of the Gaussian filter, another smoothing filter such as a moving average filter or bilateral filter may be used.

The luminance correction unit 1042 corrects the tone curve of the whole tone image data based on the exposure defect determination result (step S63). The luminance correction unit 1042 corrects the tone curve with reference to a tone correction table, stored in advance in the buffer memory 1046, in which the correspondence between the brightness of an input pixel value and that of an output pixel value is described.

Figure 7A:
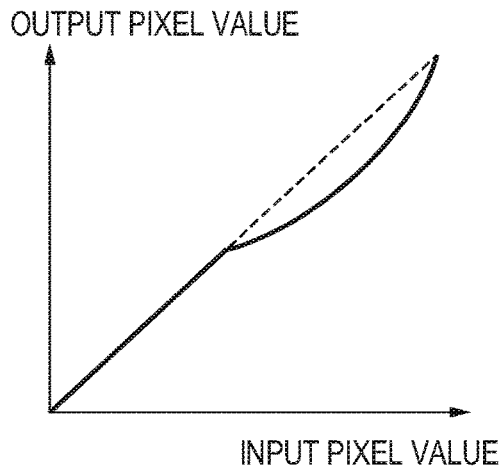
FIGS. 7A and 7B are graphs each showing an example of a tone correction table.
Figure 7B:
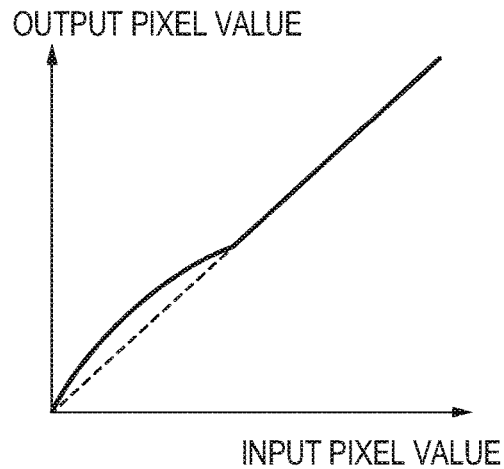

FIGS. 7A and 7B each show an example of the tone correction table. With reference to the tone correction table which decreases the brightness of a highlight portion as shown in FIG. 7A, the luminance correction unit 1042 corrects the tone curve of the whole tone image data of the correction image data determined to include blown out highlights. Similarly, with reference to the tone correction table which increases the brightness of a shadow portion as shown in FIG. 7B, the luminance correction unit 1042 corrects the tone curve of the whole tone image data of the correction image data determined to include blocked up shadows.

The luminance correction unit 1042 composes the local tone image data and the whole tone image data whose tone curve has been corrected (step S64), and saves the composed image data (luminance-corrected image data) in the buffer memory 1046 (step S65).

Panoramic Composition Unit

The processing (step S18) of the panoramic composition unit 1043 will be described with reference to a flowchart shown in FIG. 8. The panoramic composition unit 1043 acquires a plurality of image data (same exposure image data group) shot with the same exposure (step S71), and acquires the output values (pieces of information on angular velocities) of the angular velocity sensor 108 at the time of shooting, which are associated with each image data (step S72). The pieces of information on the angular velocities correspond to the angular velocities in the pan direction and tilt direction of the shooting apparatus 101, both of which are orthogonal to the optical axis of the image capturing unit (the image capturing optical system 102 and the image capturing device 103), and are obtained for each shot image data.

Next, the panoramic composition unit 1043 corrects the blur or perspective of the corresponding image data by a known technique using the pieces of information on the angular velocities (step S73), and arranges the plurality of shot images of the same exposure image data group on a plane based on the pieces of information on the angular velocities and the shooting timings of the respective image data (step S74). The images are arranged by setting an object plane (plane) assuming the object on a three-dimensional space, and projecting the shot images at positions on the object plane based on the pieces of information on the angular velocities and the shooting timings of the respective image data.

The panoramic composition unit 1043 selects one image data (to be referred to as a selected image hereinafter) from the same exposure image data group (step S75), and sets an overlapping region between the selected image and a shot image (to be referred to as an adjacent image hereinafter) of the same exposure image data group, which is adjacent to the selected image (step S76). Setting of the overlapping region will be described in detail later. If the overlapping region includes a blown out highlight region or blocked up shadow region (to be referred to as an exposure defect region hereinafter), the exposure defect region is excluded from the overlapping region (step S77).

For example, the overlapping region undergoes block division to obtain regions of a predetermined size. In the divided region, if the ratio of the number of pixels having the G values≥240 to the total number of pixels of the divided region is 90% or higher, all the pixels of the divided region are excluded as a blown out highlight region. In the divided region, if the ratio of the number of pixels having the G values≤16 to the total number of pixels of the divided region is 90% or higher, all the pixels of the divided region are excluded as a blocked up shadow region. Note that the above thresholds and ratio are merely examples, and other thresholds and ratios can be arbitrarily set.

The panoramic composition unit 1043 performs geometric transformation of the adjacent image so that the difference between pixel values in the overlapping region obtained by excluding the exposure defect region becomes smallest (step S78). The "difference between pixel values" in the overlapping region will be described later together with setting of the overlapping region. Geometric transformation is performed by, for example, affine transformation given by:

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad (2)$$

where (x, y) represent coordinates before the processing, (x', y') represent coordinates after the processing, a, b, d, and e represent rotational movement parameters (for a rotation angle θ, a=cos θ, b=−sin θ, d=sin θ, and e=cos θ), c represents a moving amount in the horizontal direction, and f represents a moving amount in the vertical direction. Affine transformation parameters which minimize the difference between pixel values in the overlapping region are set by changing the affine transformation parameters a, b, c, d, e, and f.

The panoramic composition unit 1043 determines whether the processes in steps S75 to S78 have been performed for all the image data of the same exposure image data group (step S79). If there is unprocessed image data in the same exposure image data group, the process returns to step S75; otherwise, the panoramic composition unit 1043 determines whether the composition processing in steps S71 to S78 has been performed for the plurality of same exposure image data groups of different exposures (step S80). If there is an unprocessed same exposure image data group, the process returns to step S71; otherwise, the composition processing ends.

Alignment Unit

Figure 9:
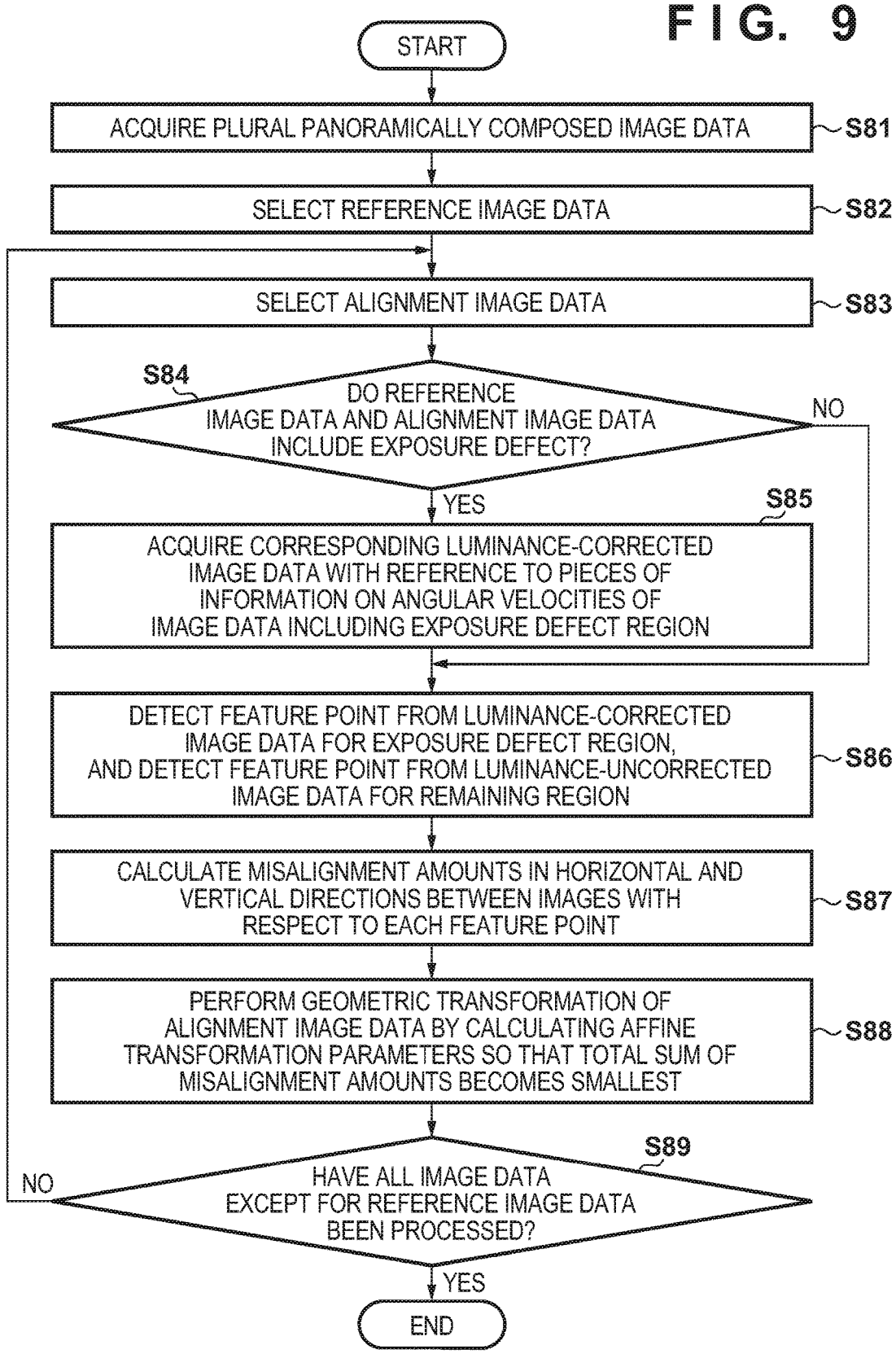
FIG. 9 is a flowchart for explaining the processing of an alignment unit.

The processing (step S19) of the alignment unit 1044 will be described with reference to a flowchart shown in FIG. 9. The alignment unit 1044 acquires the plurality of image data panoramically composed in step S18 (step S81), and selects reference image data serving as an alignment reference from those image data (step S82). For example, panoramically composed image data is selected as reference image data from a same exposure image data group shot with an exposure which is closest to the correct exposure among the plurality of exposures. Alternatively, panoramically composed image data may be selected as reference image data from same exposure image data shot with an intermediate exposure among the plurality of exposures.

The alignment unit 1044 selects alignment target image data (to be referred as alignment image data hereinafter) from the plurality of acquired image data (step S83), and determines whether the reference image data and alignment image data include an exposure defect (step S84). The same method as in step S16 is used to determine whether there is an exposure defect.

If there is an exposure defect, the alignment unit 1044 acquires luminance-corrected image data corresponding to the image data (image data before panoramic composition) including an exposure defect region with reference to the pieces of information on the angular velocities of the image data including the exposure defect region (step S85).

The alignment unit 1044 detects a feature point from the luminance-corrected image data for the exposure defect region, and detects a feature point from the luminance-uncorrected image data for the remaining region (step S86). To detect a feature point, a method of extracting edges or curvatures by filter processing and obtaining the intersection point of the edges or curves or a method using template matching may be used.

The alignment unit 1044 calculates misalignment amounts in the horizontal and vertical directions between the images with respect to each detected feature point (step S87), and performs geometric transformation of the alignment image data by calculating the affine transformation parameters so that the total sum of the misalignment amounts becomes smallest (step S88). It is then determined whether the processes in steps S83 to S88 have been performed for all the image data (image data after panoramic composition) except for the reference image data (step S89). If there is an unprocessed image data, the process returns to step S83; otherwise, the alignment processing ends.

[Setting of Overlapping Region and Difference Between Pixel Values]

Figure 10A:
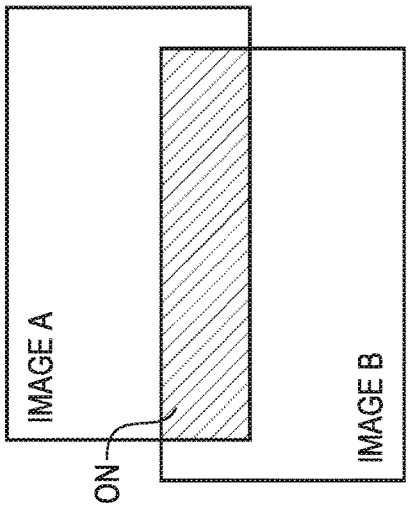
FIGS. 10A and 10B are views for explaining details of setting of an overlapping region.

Setting of the overlapping region will be described in detail with reference to FIGS. 10A and 10B. Assume, for example, that two projected images A and B are arranged using the pieces of information on the velocities, as shown in FIG. 10A. Since these images are projected on a plane under the influence of the perspective and slight misalignment of the position of the shooting apparatus 101, the pixel center of image A does not highly probably match that of image B. In addition, the pixel sizes (the center distances between adjacent pixels) may be different.

Figure 10B:
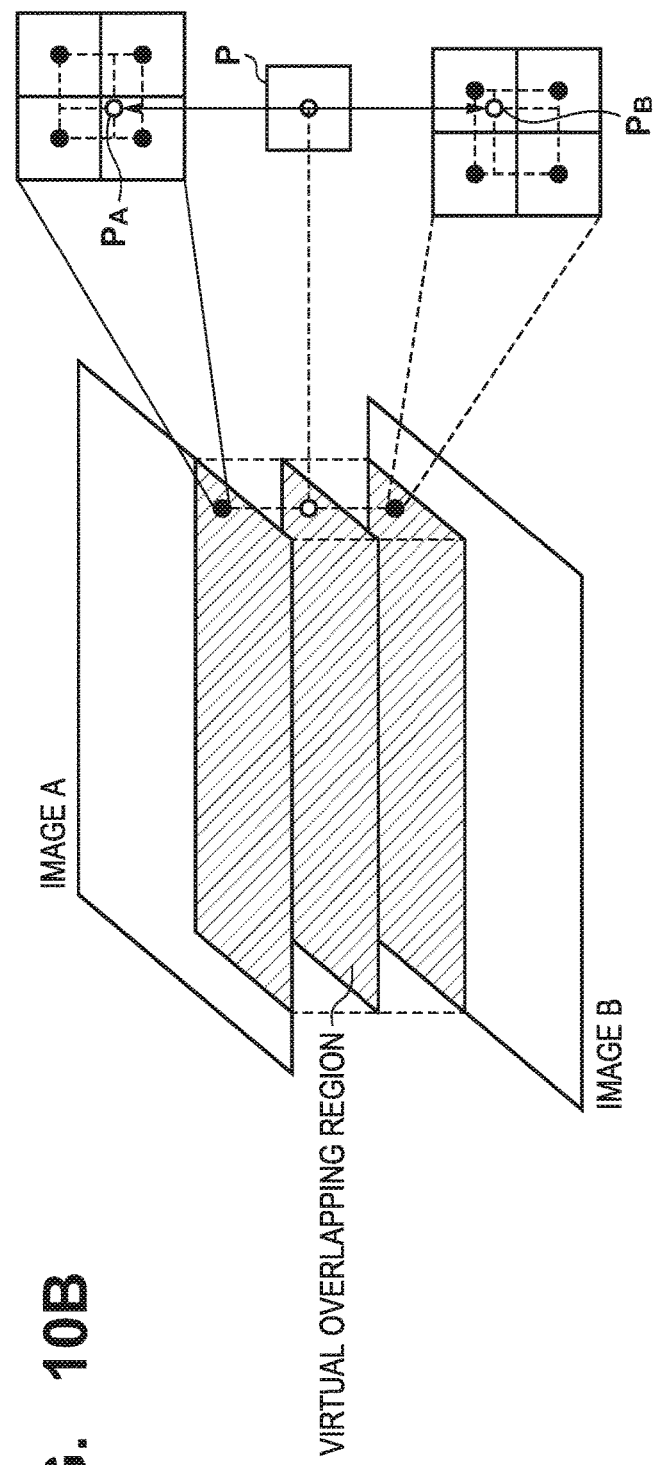

As shown in FIG. 10B, a virtual overlapping region is set between images A and B. Since images A and B are projected on the same plane, there is no space shown in FIG. 10B. However, by setting the virtual overlapping region, slightly misaligned pixels can be compared. Although the resolution of the virtual overlapping region is arbitrary, for example, a resolution corresponding to the average of the pixel sizes of images A and B is set.

In the case shown in FIG. 10B, a coordinate point on image A and a coordinate point on image B, which correspond to a pixel P in the virtual overlapping region, are represented by $P_A$ and $P_B$, respectively. Since the coordinate points $P_A$ and $P_B$ exist at positions shifted from the pixel centers of the respective images, it is impossible to set the values of the pixels $P_A$ and $P_B$ as the values of pixels including the coordinate points.

To cope with this, the values of the pixels $P_A$ and $P_B$ are calculated by interpolating the values of the neighboring pixels of the pixels $P_A$ and $P_B$. As shown in FIG. 10B, for example, each of the values of the pixels $P_A$ and $P_B$ is determined by bilinear interpolation using the values of the four neighboring pixels. Note that interpolation processing such as bicubic interpolation may be performed by increasing the number of neighboring pixels to be referred to. The difference between the thus determined values of the pixels $P_A$ and $P_B$ (an error of the pixel P in the virtual overlapping region) is used as the "difference between pixel values" in geometric transformation (step S78) of the adjacent image.

As described above, by performing luminance correction, panoramic composition, and alignment based on the exposure defect determination result, it is possible to acquire an HDR panoramic image in which misalignment of the joint between the images is suppressed and unnaturalness is eliminated.

Second Embodiment

An image processing apparatus and an image processing method according to the second embodiment of the present invention will be described below. Note that in the second embodiment, the same reference numerals as in the first embodiment denote almost the same components and a detailed description thereof may be omitted.

The first embodiment has explained the method of panoramically composing, for each exposure, a plurality of images shot by changing the exposure, aligning a plurality of panoramic images, and then performing HDR composition. The second embodiment will describe a method of performing panoramic composition by pasting, in a shooting order, images shot by changing the exposure.

Panoramic image shooting processing according to the second embodiment will be described with reference to a flowchart shown in FIG. 11. When panoramic shooting is instructed via a shooting operation unit 109 or a GUI, a shooting control unit 107 sets an exposure at the time of shooting (step S31). When the user presses the release button of the shooting operation unit 109, the shooting control unit 107 controls an image capturing optical system 102 and an image capturing device 103 to perform shooting, and controls a signal processing unit 104 to save shot image data in a storage unit 105 (step S32).

The shooting control unit 107 determines whether a shooting end has been instructed (step S33). If a shooting end has been instructed, the shooting control unit 107 ends the panoramic image shooting processing; otherwise, the shooting control unit 107 changes the exposure (step S34). When the user presses the release button of the shooting operation unit 109, the shooting control unit 107 controls the image capturing optical system 102 and the image capturing device 103 to perform shooting, and controls the signal processing unit 104 to save shot image data in the storage unit 105 (step S35). Note that the user presses the release button by moving the angle of view of a shooting apparatus 101 so that an overlapping region remains with respect to the angle of view at the time of shooting in step S32.

Based on pieces of information on angular velocities, a panoramic composition unit 1043 extracts the overlapping region between the first shot image data (to be referred to as the first image data hereinafter) and the next shot image data (to be referred to as the second image data hereinafter) (step S36). Processes in steps S37 to S40 are performed for the overlapping region, and processing in step S41 is performed for the non-overlapping region.

An image determination unit 1041 determines whether the overlapping region includes an exposure defect (step S37). A luminance correction unit 1042 performs image correction to allow detection of the texture of an image with respect to the image data which has been determined to include an exposure defect in the overlapping region, thereby generating luminance-corrected image data (step S38). An alignment unit 1044 performs alignment processing of matching the position of the second image data with the position of the first image data based on the pixel values of the overlapping region in the luminance-uncorrected image data or luminance-corrected image data (step S39). An HDR composition unit 1045 performs HDR composition of the first image data and the aligned second image data with respect to the overlapping region (step S40).

On the other hand, the luminance correction unit 1042 performs exposure correction between the first and second image data with respect to the non-overlapping region, thereby generating exposure-corrected image data of the non-overlapping region (step S41). As the exposure correction processing, the average value (to be referred to as the pixel average value hereinafter) of all the pixel values of each image is calculated, and correction is performed to equalize the pixel average values of the two images. For example, a brightness value L when RGB values are converted into CIELab values is used to calculate the pixel average value. However, the G value or the Y value of CIEXYZ values may be used. Instead of the average value, another statistic value such as a mode or median may be used.

The signal processing unit 104 replaces the first image data saved in the storage unit 105 by the image data of the overlapping region which has undergone HDR composition in step S40 and the exposure-corrected image data of the non-overlapping region which has been generated in step S41 (step S42). After that, the process returns to step S33. If no shooting end has been instructed, the exposure is changed (step S34), and shooting is performed (step S35). The processes in step S36 and subsequent steps are repeated using, as the second image data, image data newly shot in step S35.

As described above, the overlapping region is separated to perform exposure defect determination. Based on the exposure defect determination result, luminance correction, alignment, and HDR composition of the overlapping region, and exposure correction of the non-overlapping region are performed. This can acquire an HDR panoramic image in which misalignment of the joint between the images is suppressed and unnaturalness is eliminated.

[Modification]

An example of applying the present invention to the shooting apparatus 101 has been explained with reference to FIGS. 3 and 5. However, a plurality of image data shot with a plurality of different exposures by the shooting apparatus 101 may be input to the image processing apparatus via, for example, a storage medium, a serial bus, or a network, and the image processing apparatus may execute the processes in steps S16 to S21 shown in FIG. 5. The image processing apparatus implemented by a computer apparatus or dedicated hardware includes the arrangement of the signal processing unit 104 shown in FIG. 4, and is incorporated in the scope of the present invention.

Similarly, an example of applying the present invention to the shooting apparatus 101 has been explained with reference to FIG. 11. However, image data sequentially shot by the shooting apparatus 101 by changing the exposure may be input to the image processing apparatus via, for example, a serial bus or a network, and the image processing apparatus may execute the processes in steps S36 to S42 shown in FIG. 11. The image processing apparatus implemented by a computer apparatus or dedicated hardware includes the arrangement of the signal processing unit 104 shown in FIG. 4, and is incorporated in the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-023075, filed Feb. 9, 2016, which is hereby incorporated by reference herein in its entirety.

What is claimed is:

1. An image processing apparatus comprising:
    an input unit configured to input a plurality of image data shot with a plurality of different exposures;
    a determination unit configured to determine whether each of the plurality of image data includes an exposure defect;
    a generation unit configured to generate a plurality of panoramic images respectively corresponding to the plurality of exposures by panoramically composing a plurality of image data shot with the same exposure based on a result of the determination;
    an alignment unit configured to perform alignment between the plurality of panoramic images using image data determined not to include the exposure defect and image data obtained by performing luminance correction for image data determined to include the exposure defect; and
    a composition unit configured to perform high dynamic range composition for the plurality of aligned panoramic images.

2. The apparatus according to claim 1, further comprising:
    a shooting control unit configured to control an image capturing unit which shoots image data, and add, to the image data, pieces of information on angular velocities in a pan direction and a tilt direction both of which are orthogonal to an optical axis of the image capturing unit,
    wherein the input unit inputs the plurality of image data shot under the control of the shooting control unit.

3. The apparatus according to claim 2, wherein if a shooting start is instructed, the shooting control unit performs continuous shooting by sequentially changing the exposure, and if a shooting end is instructed, the shooting control unit ends the continuous shooting.

4. The apparatus according to claim 2, wherein using the pieces of information on the angular velocities, the generation unit arranges, on a plane, the plurality of image data shot with the same exposure.

5. The apparatus according to claim 4, wherein the generation unit sets an overlapping region between the image data arranged on the plane, excludes a region of the exposure defect from the overlapping region, and performs the panoramic composition by geometric transformation of the image data based on the overlapping region obtained by excluding the region of the exposure defect.

6. The apparatus according to claim 1, wherein the determination unit performs the determination of the exposure defect based on one of a ratio of the number of pixels having pixel values not smaller than a first threshold to the number of pixels of the image data and a ratio of the number of pixels having pixel values not larger than a second threshold to the number of pixels of the image data.

7. The apparatus according to claim 1, wherein the alignment unit detects a feature point from one of the image data and the image data having undergone the luminance correction, calculates a misalignment amount between the plurality of panoramic images based on the feature point, and performs the alignment by geometric transformation of the image data based on the misalignment amount.

8. The apparatus according to claim 1, further comprising:
    a correction unit configured to separate the image data determined to include the exposure defect into whole tone image data and local tone image data, correct a tone curve of the whole tone image data based on the result of the determination of the exposure defect, and outputs, as the image data having undergone the luminance correction, image data obtained by composing the local tone image data and the whole tone image data whose tone curve has been corrected.

9. An image processing apparatus for inputting first image data and second image data which have been shot with different exposures, comprising:
    an extraction unit configured to extract an overlapping region between the first image data and the second image data;
    a determination unit configured to determine whether the overlapping region includes an exposure defect;
    a correction unit configured to generate luminance-corrected image data by performing luminance correction of image data determined to include the exposure defect, and generate exposure-corrected image data of a non-overlapping region of the first image data and the second image data by performing exposure correction between the first image data and the second image data with respect to the non-overlapping region;
    an alignment unit configured to perform alignment between the first image data and the second image data based on pixel values of the overlapping region in one of image data determined not to include the exposure defect and the luminance-corrected image data; and a composition unit configured to perform high dynamic range composition of the first image data and the second image data with respect to the overlapping region, wherein the units repeat the processes by using, as the first image data, the image data of the overlapping region obtained by performing the high dynamic range composition and the exposure-corrected image data of the non-overlapping region, and using, as the second image data, newly input image data shot by changing the exposure.

10. An image processing method comprising:

inputting a plurality of image data shot with a plurality of different exposures;

determining whether each of the plurality of image data includes an exposure defect;

generating a plurality of panoramic images respectively corresponding to the plurality of exposures by panoramically composing a plurality of image data shot with the same exposure based on a result of the determination;

perform alignment between the plurality of panoramic images using image data determined not to include the exposure defect and image data obtained by performing luminance correction for image data determined to include the exposure defect; and performing high dynamic range composition for the plurality of aligned panoramic images.

11. An image processing method for an image processing apparatus which inputs first image data and second image data which have been shot with different exposures, comprising:

causing an extraction unit to extract an overlapping region between the first image data and the second image data;

causing a determination unit to determine whether the overlapping region includes an exposure defect;

causing a correction unit to generate luminance-corrected image data by performing luminance correction of image data determined to include the exposure defect, and generate exposure-corrected image data of a non-overlapping region of the first image data and the second image data by performing exposure correction between the first image data and the second image data with respect to the non-overlapping region;

causing an alignment unit to perform alignment between the first image data and the second image data based on pixel values of the overlapping region in one of image data determined not to include the exposure defect and the luminance-corrected image data; and causing a composition unit to perform high dynamic range composition of the first image data and the second image data with respect to the overlapping region, wherein the units repeat the processes by using, as the first image data, the image data of the overlapping region obtained by performing the high dynamic range composition and the exposure-corrected image data of the non-overlapping region, and using, as the second image data, newly input image data shot by changing the exposure.

12. A non-transitory computer-readable storage medium storing a computer program for causing a computer to execute an image processing method, the method comprising:

inputting a plurality of image data shot with a plurality of different exposures;

determining whether each of the plurality of image data includes an exposure defect;

generating a plurality of panoramic images respectively corresponding to the plurality of exposures by panoramically composing a plurality of image data shot with the same exposure based on a result of the determination;

perform alignment between the plurality of panoramic images using image data determined not to include the exposure defect and image data obtained by performing luminance correction for image data determined to include the exposure defect; and performing high dynamic range composition for the plurality of aligned panoramic images.

13. A non-transitory computer-readable storage medium storing a computer program for causing a computer to execute an image processing method, the method being an image processing method for an image processing apparatus which inputs first image data and second image data which have been shot with different exposures, the method comprising:

causing an extraction unit to extract an overlapping region between the first image data and the second image data;

causing a determination unit to determine whether the overlapping region includes an exposure defect;

causing a correction unit to generate luminance-corrected image data by performing luminance correction of image data determined to include the exposure defect, and generate exposure-corrected image data of a non-overlapping region of the first image data and the second image data by performing exposure correction between the first image data and the second image data with respect to the non-overlapping region;

causing an alignment unit to perform alignment between the first image data and the second image data based on pixel values of the overlapping region in one of image data determined not to include the exposure defect and the luminance-corrected image data; and causing a composition unit to perform high dynamic range composition of the first image data and the second image data with respect to the overlapping region, wherein the units repeat the processes by using, as the first image data, the image data of the overlapping region obtained by performing the high dynamic range composition and the exposure-corrected image data of the non-overlapping region, and using, as the second image data, newly input image data shot by changing the exposure.

* * * * *